United States Patent
Ziegler et al.

(10) Patent No.: US 8,155,422 B2
(45) Date of Patent: Apr. 10, 2012

(54) DYNAMIC OPTIMIZATION OF THE SIGNAL-TO-NOISE RATIO OF DUAL-ENERGY ATTENUATION DATA FOR RECONSTRUCTING IMAGES

(75) Inventors: Andy Ziegler, Hamburg (DE); Ewald Roessl, Ellerau (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 822 days.

(21) Appl. No.: 12/293,835

(22) PCT Filed: Mar. 15, 2007

(86) PCT No.: PCT/IB2007/050884
§ 371 (c)(1),
(2), (4) Date: Sep. 22, 2008

(87) PCT Pub. No.: WO2007/110796
PCT Pub. Date: Oct. 4, 2007

(65) Prior Publication Data
US 2010/0232669 A1    Sep. 16, 2010

(30) Foreign Application Priority Data
Mar. 29, 2006   (EP) ..................... 06111885

(51) Int. Cl.
*G06K 9/00* (2006.01)
(52) U.S. Cl. ............... 382/132; 382/130; 378/4; 378/5
(58) Field of Classification Search ............. 382/130, 382/132; 378/4, 5
See application file for complete search history.

(56) References Cited

U.S. PATENT DOCUMENTS

| | | | |
|---|---|---|---|
| 4,868,857 A | 9/1989 | Dobbins, III | |
| 5,081,659 A | 1/1992 | Dobbins, III | |
| 5,115,394 A * | 5/1992 | Walters | 382/131 |
| 6,408,050 B1 | 6/2002 | Han et al. | |
| 6,683,934 B1 * | 1/2004 | Zhao et al. | 378/9 |
| 7,190,757 B2 * | 3/2007 | Ying et al. | 378/5 |
| 7,822,169 B2 * | 10/2010 | Roessl et al. | 378/5 |
| 7,826,587 B1 * | 11/2010 | Langan et al. | 378/16 |
| 2002/0094062 A1 * | 7/2002 | Dolazza et al. | 378/98.9 |
| 2003/0076988 A1 | 4/2003 | Liang et al. | |
| 2006/0109949 A1 * | 5/2006 | Tkaczyk et al. | 378/4 |

FOREIGN PATENT DOCUMENTS

| | | |
|---|---|---|
| DE | 10237546 B4 | 11/2007 |
| EP | 0981998 A1 | 3/2000 |
| GB | 1374610 | 11/1974 |
| WO | 2005092187 A1 | 10/2005 |

* cited by examiner

Primary Examiner — Alexander H Taningco

(57) ABSTRACT

It is described a method for dynamically optimizing the signal-to-noise ratio of attenuation data related to two different X-ray energies for reconstructing an image of an object under examination. The method comprises (a) estimating the thickness and the material composition of the object at a plurality of different projection angles, (b) for each of the various projection angles calculating for a variety of combinations of different first and second X-ray energies a corresponding common signal-to-noise ratio, (c) for each of the various projection angles choosing the first and the second X-ray energy causing the maximum corresponding common signal-to-noise ratio, and (d) for each of the various projection angles acquiring X-ray attenuation data of the object whereby the two X-ray energies are the X-ray energies causing a maximum signal-to-noise ratio assigned to the respective projection angle.

19 Claims, 5 Drawing Sheets

DYNAMIC OPTIMIZATION OF THE SIGNAL-TO-NOISE RATIO OF DUAL-ENERGY ATTENUATION DATA FOR RECONSTRUCTING IMAGES

The present invention relates to the field of dual energy X-ray imaging. Thereby, two different images of one and the same object under examination are obtained, whereby for each image X-rays having different X-ray photon energies are used. In particular, the present invention relates to a method for optimizing the signal-to-noise ratio of X-ray attenuation data related to two different X-ray energies for reconstructing a two- or a three-dimensional image of an object under examination.

The present invention further relates to a computed tomography system for generating X-ray images of an object under examination based on attenuation data related to two different X-ray energies. The computed tomography system comprises a radiation source, a radiation detector and a rotatable holder for jointly rotating the radiation source and the radiation detector around the object under examination.

Further, the present invention relates to a data processing device for optimizing the signal-to-noise ratio of X-ray attenuation data related to two different X-ray energies for reconstructing an image of an object under examination.

Furthermore, the present invention relates to a computer-readable medium and to a program element having instructions for executing the above-mentioned method for optimizing the signal-to-noise ratio of X-ray attenuation data related to two different X-ray energies for reconstructing an image of an object under examination.

Today, doctors and technicians commonly have access to very sophisticated medical diagnostic X-ray imaging devices. Typically during the operation of an X-ray imaging device, an X-ray source emits X-ray photons under very controlled circumstances. The X-ray photons travel through a region of interest (ROI) of a patient under examination and impinge upon a detector. In the past, X-ray imaging devices employed rudimentary film based detectors. However, recent developments have led to solid-state detectors comprised of a grid of discrete detector elements that individually respond to exposure by X-ray photons. Regardless of the detector used, however, the goal remains the same, namely, to produce a clear resultant image of pre-selected ROI (e.g. specific types of tissues) within an object of interest.

There is an inherent difficulty associated with producing a clear resultant image, however. In particular, because the X-ray photons travel through the entire patient, the image formed on the detector is a superposition of all the anatomic structures through which X-ray photons pass, including the pre-selected ROI. The superposition of anatomic structures is sometimes referred to as "anatomic noise". The effect of anatomic noise on the resultant image is to produce clutter, shadowing, and other obscuring effects that render the resultant image much less intelligible than the ideal clear resultant image.

Attempts to reduce the effects of anatomic noise included, for example, "dual-energy" imaging. When employing dual-energy imaging, a doctor or technician acquired two images each with different average X-ray photon energies. Because different internal structures absorb different X-ray photon energies to different extents, it was possible to combine the two resultant images to suppress anatomic noise. Dual-energy techniques typically proceed in one of two ways.

A first approach uses two stacked detectors. A single exposure then produces a first image in the first detector. Some X-ray photons continue through the first detector to impinge upon the second detector. The first and second detectors are designed to sense different average energies, thereby producing two images of the ROI corresponding to the two average X-ray photon energies. A second approach uses a single detector and two exposures each with different average X-ray photon energy.

U.S. Pat. No. 6,408,050 B1 discloses a method for energy dependent imaging of a region of interest. The method includes the step of exposing an X-ray detector to X-ray photons during an examination period, and separating the X-ray photons into two groups, those with energies above a selected energy threshold, and those with energies below a selected energy threshold. The X-ray photons with energy above the threshold are counted to provide a first energy photon count, while the X-ray photons with energy below the threshold are counted to provide a second energy photon count. The method stores the first energy photon count and the second energy photon count in a memory as examination data, and produces an image by applying an image processing technique to the examination data.

WO 2005/092187 A1 discloses an apparatus and a method for an angiographic imaging. Thereby, an X-ray tube is energized and a myocardium is imaged while contrast agent is infused to the coronary arteries of the subject. Single photon counting data acquired with the detector while two thresholds are set to form simultaneously low-energy images and high-energy images. The images are processed and displayed. The thresholds levels are adjusted by using radioactive sources, which emit, among other radiation, X-ray photons with a defined energy of e.g. 32 keV. A threshold level of a low level discriminator is gradually increased for each readout channel while the output counting rate is monitored. As the discriminator level increases over 32 keV, the count rate drops. The threshold level is set at a level slightly below the drop level.

US 2003/0076988 A1 discloses a method for treating noise in low-dose computed tomography projections and reconstructed images. The method comprises applying a domain specific filter in a sinogram domain of the raw data and applying an edge preserving smoothing filter in an image domain of the raw data after filtering in the sinogram domain.

EP 981 998 A1 discloses an adjustment of an X-ray source current to reduce image noise to better accommodate different scanning parameters. The X-ray source current may be adjusted as a function of image slice thickness, scan rotation time, collimation mode, table speed, scan mode, and filtration mode. Particularly, a function is stored in a computed tomography system computer to determine an X-ray source current adjustment factor so that the appropriate X-ray source current is supplied to the X-ray source for the determined parameters. After adjusting the X-ray source current, an object is scanned.

SU 1261143 discloses a high voltage X-ray apparatus. The X-ray apparatus is equipped with an X-ray filter comprising two identical wedge sides facing each other.

In X-ray imaging of human patients it is always a challenge to reduce the radiation dose to a minimum. In order to achieve this challenge modern X-ray detectors having a high efficiency in photon counting are very helpful. Such X-ray detectors typically comprise a plurality of detector elements arranged within an array in order to provide for a two-dimensional spatial resolution. However, when the radiation dose is reduced, the photon count rate for each detector element is also reduced. This has the consequence, that the acquired images exhibit a noisy background. In other words, the signal-to-noise ratio (SNR) is reduced.

There may be a need for a noise reduction in dual-energy X-ray imaging in order to improve the signal-to-noise ratio (SNR) of the acquired images.

This need may be met by the subject matter according to the independent claims. Advantageous embodiments of the present invention are described by the dependent claims.

According to a first aspect of the present invention there is provided a method for optimizing the signal-to-noise ratio of attenuation data related to two different X-ray energies for reconstructing an image of an object under examination. The described method comprises (a) estimating the thickness and the material composition of the object at a first projection angle of X-rays traversing the object and (b) estimating the thickness and the material composition of the object at a second projection angle of X-rays traversing the object.

The described method further comprises (c) selecting a first X-ray energy assigned to the first projection angle and a second X-ray energy assigned to the first projection angle in such a manner that a first common signal-to-noise ratio of attenuation data based on the first X-ray energy assigned to the first projection angle and on the second X-ray energy assigned to the first projection angle is optimized.

Further, the described method comprises (d) selecting a first X-ray energy assigned to the second projection angle and a second X-ray energy assigned to the second projection angle in such a manner that a second common signal-to-noise ratio of attenuation data based on the first X-ray energy assigned to the second projection angle and on the second X-ray energy assigned to the second projection angle is optimized.

Furthermore, the described method comprises (e) acquiring X-ray attenuation data of the object at the first projection angle with the first X-ray energy assigned to the first projection angle and with the second X-ray energy assigned to the first projection angle and (f) acquiring X-ray attenuation data of the object at the second projection angle with the first X-ray energy assigned to the second projection angle and with the second X-ray energy assigned to the second projection angle.

This aspect of the invention is based on the idea that because of photon statistic reasons the SNR of an image strongly depends on the photon count rates for each pixel of the image. This hold also for dual-energy imaging, wherein two images obtained with different X-ray energies may be combined for a final image.

At this point it has to be mentioned that the term X-ray energy represents any arbitrary spectral distribution of X-ray photons. In this respect the first and/or the second X-ray energy may represent a monochromatic X-radiation or a polychromatic X-radiation within an energy range. In the case of a polychromatic X-radiation the corresponding first and the second energy ranges may be separated from each other, may be adjacent to each other or may have a spectral overlap.

According to the described method the two energies are selected individually for each projection angle such that the attenuation data corresponding to the first and respectively to the second photon energy benefit more or less equally from a sufficient count rate. In other words, by taking into account the individual SNR of the separate attenuation data a maximum overall SNR of a final reconstructed two- or three-dimensional image may be achieved. This means that the X-ray energies are selected such that the count rates for both attenuation data have at least an acceptable level in order not to have one attenuation data set with a very high SNR and another attenuation data set with a very low SNR.

The object under examination may be e.g. a human or an animal body. However, the object under examination may also be a region of interest representing a part or a portion of the object of interest, e.g. the head of a patient.

The processing of attenuation data acquired at different X-ray photon energies may be carried out separately. In other words, by combining a plurality of attenuation data obtained at different projection angles two independent images may be reconstructed, which have been measured with different photon energies. Thereby, the energies of the photons, which are taken into account for one independent image, may vary slightly for different projection angles. This may be based on the fact that at different projection angles the object under examination might exhibit different thicknesses and/or different material compositions.

Alternatively, the processing of attenuation data acquired at different X-ray photon energies and at different projection angles may also be carried out in conjugation. Thereby, only one two- or three-dimensional image may be reconstructed. However, due to an increased sensitivity of the corresponding dual-energy image reconstruction, a final image with an improved quality may be reconstructed.

According to an embodiment of the present invention the step of estimating the thickness and the material composition of the object at the first projection angle and at the second projection angle, respectively, comprises taking over corresponding data from a standard data set representing the thickness and the material composition of the object under examination. The standard data set may be e.g. derived from a standard phantom corresponding to the real object of interest. Nowadays, appropriate phantoms are available for all parts of in particular a human body. These phantoms include a composition of different materials, which exhibit at least within the diagnostically relevant energy range a similar X-ray attenuation or X-ray absorption behavior compared to the object of interest. Common materials are for instance water and calcium.

It has to be mentioned that it is not necessary to use a physically existent phantom. For carrying out the described method it is sufficient to use the X-ray attenuation data of such a phantom. These data are publicly available, e.g. on the Internet.

According to a further embodiment of the present invention the step of estimating the thickness and the material composition of the object at the first projection angle and at the second projection angle, respectively, comprises accomplishing an initial attenuation measurement of the object at different projection angles. This may provide the advantage that the expected thickness and the material composition of the real object can be evaluated. In case of examining a human patient this may be called a patient adaptive optimization of the signal-to-noise ratio.

It is clear that the initial attenuation measurement may be carried out at a plurality of different projection angles such that the measurement corresponds to an initial scanogram or pre-scan of the object under examination. However, typically it is sufficient that the initial attenuation measurement may be accomplished at a comparatively low dose such that the improved quality of a final reconstructed dual-energy image justifies the additional radiation dose even in case the object under examination is a human being.

It has to be pointed out that the initial measurement may be carried out at one or also at two different photon energies. In any case, the thickness and the material composition of the real object should be evaluated with such a precision that the improved quality of the final reconstructed two- or three-dimensional image justifies the additional radiation dose caused by the initial measurement.

According to a further embodiment of the present invention the step of selecting the first and the second X-ray energy assigned to the first projection angle comprises calculating for a variety of combinations of different first and second X-ray energies a respective first common signal-to-noise ratio and choosing the first and the second X-ray energy causing the maximum first common signal-to-noise ratio.

This means that a two-dimensional (2D) optimization procedure is used in order to find the best values for the first and the second X-ray energy, respectively. In this respect, two-dimensional optimization procedure means that two values, the first and the second X-ray energy, respectively, may be varied independently from each other.

According to a further embodiment of the present invention the step of selecting the first and the second X-ray energy assigned to the second projection angle comprises calculating for a variety of combinations of different first and second X-ray energies a respective second common signal-to-noise ratio and choosing the first and the second X-ray energy causing the maximum second common signal-to-noise ratio.

This means that also for the second projection angle a two-dimensional optimization procedure is used in order to find the best values for the corresponding first and the second X-ray energy, respectively.

According to a further embodiment of the present invention the method further comprises the steps of (a) estimating the thickness and the material composition of the object at a further projection angle of X-rays traversing the object and (b) selecting a first X-ray energy assigned to the further projection angle and a second X-ray energy assigned to the further projection angle in such a manner that a further common signal-to-noise ratio of attenuation data based on the first X-ray energy assigned to the further projection angle and on the second X-ray energy assigned to the further projection angle is optimized. The method according to this embodiment further comprises (c) acquiring X-ray attenuation data of the object at the first projection angle with the first X-ray energy assigned to the further projection angle and with the second X-ray energy assigned to the further projection angle.

In this context it is pointed out that a high number of employed projection angles respectively view angles has the advantage that the accuracy of the final reconstructed image may be improved due to a more detailed data base for the image reconstruction.

According to a further embodiment of the present invention the first X-ray energy and the second X-ray energy are within any range between 10 keV and 150 keV. In this respect it has to be noted that all elements, which are typically included in human and/or animal bodies with a significant composition, have a relative low atomic number. Therefore, the characteristic K-edges of the X-ray absorption are well below the lower limit of the given energy range. Therefore, the dependency of the attenuation line integrals from energy is typically a smooth function.

According to a further embodiment of the present invention the first X-ray energies and the second X-ray energies are provided by an X-ray source emitting a polychromatic energy spectrum. Typically, an X-ray tube emits such a polychromatic spectrum, which depends in particular on the acceleration voltage. Also two or more different X-ray sources may be used.

In this respect it is pointed out that X-ray photons belonging to two energies within a polychromatic energy spectrum may be detected simultaneously. Thereby, appropriate energy resolving detectors have to be employed in order to discriminate X-ray photons from each other, which photons are assigned to the different X-ray energies.

According to a further embodiment of the present invention the first X-ray energies are first energy intervals. This has the advantage that all photons within this energy interval may be used such that the effective photon count rate and, as a consequence, the corresponding SNR is increased.

According to a further embodiment of the present invention the second X-ray energies are second energy intervals. Thereby, the first energy interval and the second energy interval may be chosen in such a manner that most of the photons, which penetrate the object of interest, contribute to the final image. Therefore, the radiation dose for a patient may be used efficiently for obtaining a high photon count rate within the final dual energy X-ray image.

According to a further embodiment of the present invention on the energy scale the first energy intervals and the corresponding second energy intervals abut to each other at a respective energy value representing a threshold energy. This has the advantage that all photons having an energy lying within a wide energy range may be used in order to obtain a dual energy image.

It has to be pointed out that because of a dynamic adaptation of the first and the second energy intervals for each projection angle there is a respective threshold energy assigned to each projection respectively view angle.

According to a further embodiment of the present invention the step of acquiring X-ray attenuation data at the first respectively the second projection angle comprises using an X-ray detector having an energy resolution and varying, depending on the current projection angle, the first and the second X-ray energy, respectively.

In this respect, an X-ray detector having an appropriate energy resolution is used for effectively separating photons having first X-ray energies from photons having second X-ray energies.

In this context it is clear that the energy resolution may also be achieved by means of appropriate electronic devices, which are downstream connected to the actual X-ray detector. In this case it is necessary that the detector provides an output signal, which is in a good approximation direct proportional to the energy of a detected X-ray photon.

Photons having an energy lower than a corresponding threshold energy may be counted as first energy radiation events. Accordingly, photons having an energy higher than a corresponding threshold energy may be counted as second energy radiation events. This has the advantage that by varying the only one parameter of the threshold energy for each projection angle the corresponding first and the corresponding second X-ray energy are varied simultaneously.

According to a further embodiment of the present invention the step of acquiring X-ray attenuation data at the first respectively the second projection angle comprises varying, depending on the current projection angle, an acceleration voltage of the X-ray source.

In this respect the X-ray source typically is a conventional X-ray tube, wherein electrons emitted from a cathode are directed in a focused manner onto the surface of an anode.

It has noted that varying an acceleration voltage between the cathode and the anode may also be combined with a variation of a threshold energy of an energy resolving detector.

According to a further embodiment of the present invention the step of acquiring X-ray attenuation data at the first respectively the second projection angle comprises varying, depending on the current projection angle, the material and/or the thickness of a filter which is arranged in between the X-ray source and a dedicated X-ray detector.

Preferably, the filter representing an element for effectively changing the spectral distribution of the detected X-radiation is located in between the X-ray source and the object under examination. This situation, which may be called a pre-filtering, has the advantage that the effective radiation dose e.g. for a patient is significantly reduced compared to a so-called post filtering, whereby the filter is arranged in between the object and the dedicated X-ray detector.

According to a further embodiment of the present invention the material and/or the thickness of the filter is varied in such a manner that the entire absorption of X-rays traversing the object is kept stable at least approximately at the first projection angle and at the second projection angle. This criterion may allow for an easy calculation of the optimal filter setting.

It has to be mentioned that by quickly varying the measurement conditions, in particular by varying the acceleration voltage and/or by using different X-ray filters, the photons belonging to different X-ray energies may also be detected successively. In that case, usual X-ray detectors providing no energy resolution may be sufficient.

According to a further embodiment of the present invention the step of varying the material and/or the thickness of the filter comprises
moving, depending on the current projection angle, two filter elements in a symmetric manner in to and out of an X-ray beam being emitted from the X-ray source.

Preferably, the filter elements are wedges, which are formed in a symmetric manner preferably from the same material.

It has to be mentioned that the described method is not limited to a dual-energy X-ray imaging. Since both modern detectors provide a high-energy resolution and modern data processing devices provide a high computing power the described method can also be accomplished with three or even more different energies. Therefore, even more informative X-ray images may be generated.

According to a further aspect of the present invention there is provided a computed tomography system for generating two- or three-dimensional X-ray images of an object under examination based on attenuation data related to two different X-ray energies. The described computed tomography system comprises (a) a radiation source adapted for emitting a radiation beam, (b) a radiation detector adapted for detecting the radiation beam after the beam has passed the object, (c) a rotatable holder for jointly rotating the radiation source and the radiation detector around the object under examination, (d) a memory for storing estimated data related to the thickness and/or to the material composition of the object and for storing acquired X-ray attenuation data of the object at different projection angles and with two different X-ray energies, and (e) a data processor. The data processor is adapted for performing exemplary embodiments of the above-described method.

According to a further aspect of the invention there is provided a data processing device for optimizing the signal-to-noise ratio of attenuation data related to two different X-ray energies for reconstructing an image of an object under examination. The described data processing device comprises (a) a memory for storing estimated data related to the thickness and/or to the material composition of the object and for storing acquired X-ray attenuation data of the object at different projection angles and with two different X-ray energies, and (b) a data processor for optimizing the signal-to-noise ratio of attenuation data related to two different X-ray energies for reconstructing an image of the object under examination. The data processor is adapted for performing exemplary embodiments of the above-described method.

According to a further aspect of the invention there is provided a computer-readable medium on which there is stored a computer program for optimizing the signal-to-noise ratio of attenuation data related to two different X-ray energies for reconstructing an image of an object under examination. The computer program, when being executed by a data processor, is adapted for performing exemplary embodiments of the above-described method.

According to a further aspect of the invention there is provided a program element for optimizing the signal-to-noise ratio of attenuation data related to two different X-ray energies for reconstructing an image of an object under examination. The program element, when being executed by a data processor, is adapted for performing exemplary embodiments of the above-described method.

The program element may be written in any suitable programming language, such as, for example, C++ and may be stored on a computer-readable medium, such as a CD-ROM. Also, the computer program may be available from a network, such as the World Wide Web, from which it may be downloaded into image processing units or processors, or any suitable computer.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered to be disclosed with this application.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

The illustration in the drawing is schematically. It is noted that in different drawings, similar or identical elements are provided with the same reference signs or with reference signs, which are different from the corresponding reference signs only within the first digit.

Figure 1:
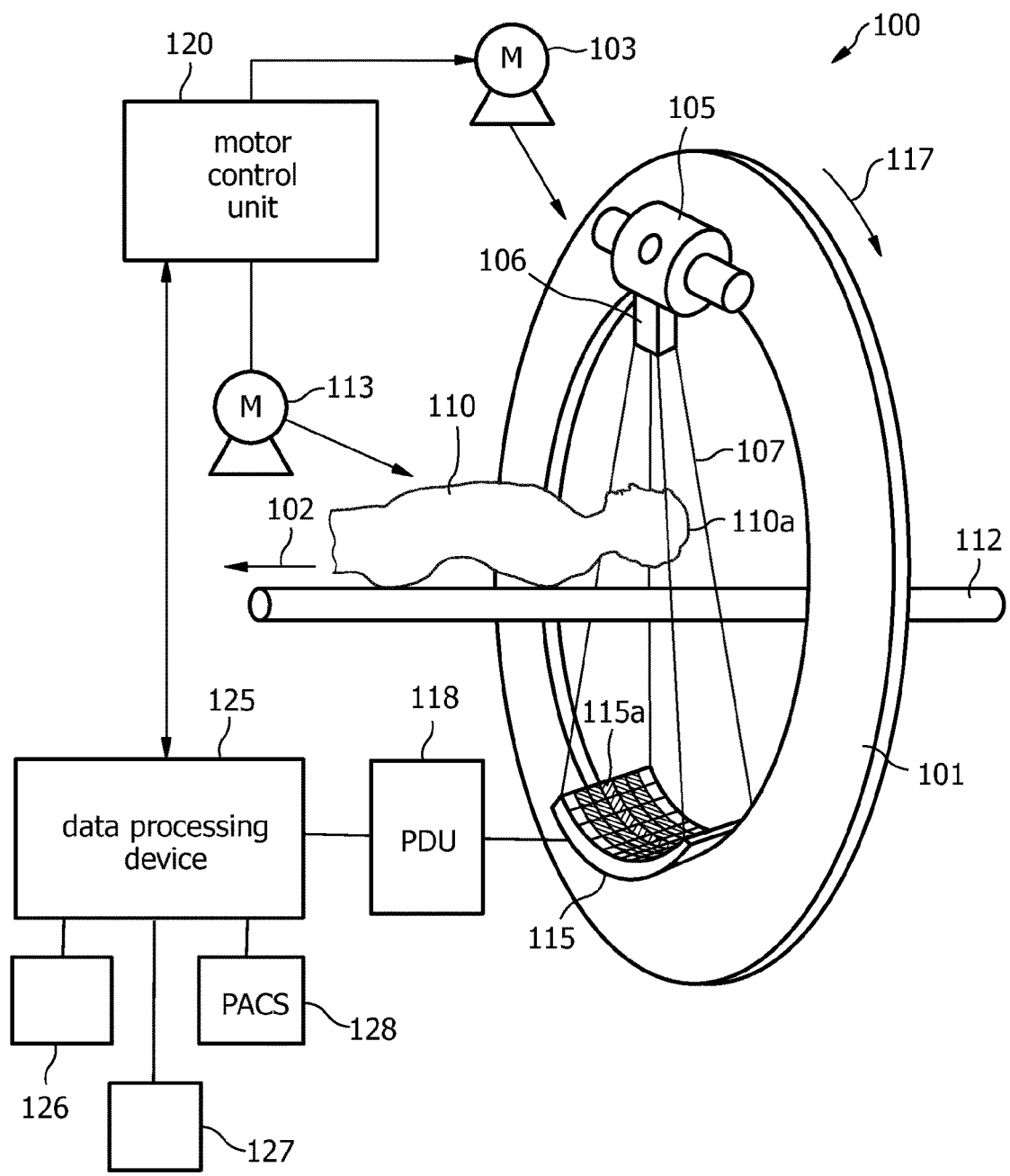
FIG. 1 shows a simplified schematic representation of a dual energy computer tomography (CT) system.

In the following there will be first given some theoretical background information related to the influence of photon statistics on the SNR in dual-energy imaging.

Dual energy X-ray imaging introduces an additional processing step into the image processing steps of conventional X-ray or computed tomography (CT) systems. This processing step is based on the important insight, that the energy dependence of the mass attenuation coefficient $\mu(E)$ of matter in the energy range of diagnostic interest (i.e. the energy range between approximately 10 keV and 150 keV) can be well approximated by a linear combination of only two attenuation base functions $\mu_1(E)$ and $\mu_2(E)$. This can be understood from a physical point of view as the sum of the total cross-sections for the photo effect and for Compton scattering.

However, this behavior can also be described by the combination of the mass attenuation of water and calcium. These base materials are often more convenient for physicians in order to understand the X-ray attenuation behavior of alive human and/or animal tissue since theses materials are important constituents of human tissue.

The above-mentioned processing step involves the solution of the following set of non-linear equations:

$$M_1 = C_1 \int_0^{E_T} \Phi_1(E) e^{-A_1\mu_1(E) - A_2\mu_2(E)} D_1(E) dE = f_1(A_1, A_2) \quad (1a)$$

$$M_2 = C_2 \int_{E_T}^{\infty} \Phi_2(E) e^{-A_1\mu_1(E) - A_2\mu_2(E)} D_2(E) dE = f_2(A_1, A_2) \quad (1b)$$

Here, $M_1$ and $M_2$ are the number of photons, which are detected in the energy interval ranging from 0 to $E_T$ and from $E_T$ to $\infty$, respectively. $C_1$ and $C_2$ are arbitrary coefficients, respectively. $E_T$ is a threshold energy separating each photon detection event into either an event contributing to $M_1$ or an event contributing to $M_2$. This separation can be realized by using so-called single threshold detectors, which are widely known in the field of X-ray photon detection.

In the above given formulae $\Phi_1(E)$ and $\Phi_2(E)$ represent the filtered photon number spectra within the two above-mentioned energy intervals, respectively, which photons impinge on the object of interest. The arithmetic expression $D_1(E)$ and $D_2(E)$ denote the efficiency of the corresponding detector for the two energy intervals, respectively. $A_1$ and $A_2$ are the mass attenuation line integrals for the two energy intervals, respectively.

Both formula (1a) and (1b) can be rewritten as functions which only depend on $A_1$ and on $A_2$.

It has to be mentioned that if one uses an energy-integrating detector, i.e. the respective detector output is proportional to the deposed photon energy within the two energy intervals, the above-mentioned formulae have to be amended. In that case the corresponding integrand of both formulae additionally comprises the photon energy E, respectively.

It can be shown that the variances $\sigma_{A_i}^2$ of the derived quantities $A_i$ are related to the signal to noise ratios $SNR_1$ and $SNR_2$ of the original measurements $M_i$ through:

$$\sigma_{A_1}^2 = \frac{\mu_{22}^2/SNR_1^2 + \mu_{12}^2/SNR_2^2}{(\mu_{11}\mu_{22} - \mu_{12}\mu_{21})^2} \quad (2a)$$

$$\sigma_{A_2}^2 = \frac{\mu_{21}^2/SNR_1^2 + \mu_{11}^2/SNR_2^2}{(\mu_{11}\mu_{22} - \mu_{12}\mu_{21})^2} \quad (2b)$$

Thereby, $\mu_{ij} \equiv -\frac{\partial \ln(M_i)}{\partial A_j}$, $(i, j = 1, 2)$.

Here, $\mu_{ij}$ represent effective attenuation coefficients over the spectra transmitted through the object. The formulae (2a) and (2b) may be derived from the above-given formulae (1a) and (1b) by applying the so-called Gauss error propagation rule. $\sigma_{A_i}$ is direct proportional to the width of a Gauss distribution depicting the distribution of the mass attenuation line integrals $A_i$ as a function of the statistical distribution of the photon counts.

As one can easily see from the above given formulas, the maximal SNR for each of the two images strongly depends on the threshold energy $E_T$. This means that the optimal threshold energy $E_T$ is different for the reconstructed photo or Compton or for the water or calcium images. However, the spectra and base materials affect the noise mainly through the denominators in the above formulae which are equal to the so-called "spectral quality factor" given by $SQF = (\mu_{11}\mu_{22} - \mu_{12}\mu_{21})^2$. Therefore, the optimal thresholds for photo and Compton images (or water and calcium images) will be similar.

According to an embodiment of the invention a minimization of the above-given variances and respective a maximization of the corresponding SNR is achieved by dynamically optimizing the threshold energy $E_T$. This means that in the coarse of a rotational scan the threshold energy $E_T$ is repeatedly optimized for each projection angle at which the dual-energy X-rays traverse the object under examination.

In has to be pointed out that such an optimization procedure could also be carried out by means of periodically adapting the measurement conditions for each X-ray projection angle. Such measurement conditions are e.g. the acceleration voltage of an X-ray tube and/or the thickness and/or the composition of X-ray filters, which are arranged in the dual-energy X-ray paths.

FIG. 1 shows a computer tomography apparatus 100, which is also called a CT scanner. The CT scanner 100 comprises a gantry 101, which is rotatable around a rotational axis 102. The gantry 101 is driven by means of a motor 103.

Reference numeral 105 designates a source of radiation such as an X-ray source, which emits polychromatic radiation. The CT scanner 100 further comprises an aperture system 106, which forms the radiation beam emitted from the radiation source 105 into a polychromatic radiation beam 107. The spectral distribution of the radiation beam 107 emitted from the radiation source 105 may further be changed by a filter element (not shown), which is arranged close to the aperture system 106.

The radiation beam 107, which may by a cone-shaped or a fan-shaped beam 107, is directed such that it penetrates an object of interest 110a. According to the exemplary embodiment described herewith, the object of interest is a head 110a of a patient 110.

The patient 110 is positioned on a movable table 112. The patient's head 110a is arranged in the center of the gantry 101, which represents the examination region of the CT scanner 100. After penetrating the region of interest 110a the polychromatic radiation beam 107 impinges onto a radiation detector 115. In order to be able to separate each photon detection event into a low-energy photon event or into a high-energy photon event, the radiation detector 115 comprises an energy resolution.

As may be taken from FIG. 1, the energy-resolving detector 115 is arranged on the gantry 101 opposite to the source of radiation 105. The detector 115 comprises a plurality of detector elements 115a wherein each is capable of detecting X-ray photons, which have been scattered by or passed through the head 110a of the patient 110.

During scanning the region of interest 110a, the X-ray source 105, the aperture system 106 and the detector 115 are rotated together with the gantry 101 in a rotation direction indicated by an arrow 117. For rotation of the gantry 101, the motor 103 is connected to a motor control unit 120 which itself is connected to a data processing device 125. The data processing device 125 includes a reconstruction unit, which may be realized by means of hardware and/or by means of software. The reconstruction unit is adapted to reconstruct a two- or three-dimensional image based on a plurality of two-dimensional images obtained under various observation angles.

Furthermore, the data processing device 125 serves also as a control unit, which communicates with the motor control unit 120 in order to coordinate the movement of the gantry 101 with a movement of the table 112. A linear displacement of the table 112 is carried out by a motor 113, which is also connected to the motor control unit 120.

The CT scanner 100 captures computer tomography data of the head 110a. Thereby, the gantry 101 rotates and in the same time the table 112 is shifted linearly parallel to the rotational axis 102 such that a helical scan of the region of interest 110a is performed.

It should be noted that it is also possible to perform a circular scan, where there is no displacement in a direction parallel to the rotational axis 102, but only the rotation of the gantry 101 around the rotational axis 102. Thereby, slices of the head 110a may be measured with high accuracy.

The detector 115 is coupled to a pulse discriminator unit 118 allowing for a separation of each photon-detection event into a low-energy event or alternatively into a high-energy event. The pulse discriminator unit 118 is coupled to the data processing device 125, which is capable, based on the corresponding low-energy photon counts and on the corresponding high-energy photon counts, to reconstruct two different images. These images may be combined by means of the data processing device 125 in order to generate a final reconstructed two- or three dimensional image. Alternatively, the two images may be outputted separately such that a physician is able to interpret the two images.

It has to be mentioned that in between the detector 115 and the data processing device 125 there may be connected further electronic devices, which allow for a real time data handling of the acquired projection data.

In order to observe the reconstructed images a display 126 is provided, which is coupled to the data processing device 125. Additionally, the two images may also be printed out by a printer 127, which is also coupled to the data processing device 125. Further, the data processing device 125 may also be coupled to a picture archiving and communications system 128 (PACS).

It should be noted that monitor 126, the printer 127 and/or other devices supplied within the CT scanner 100 might be arranged local to the computer tomography apparatus 100. Alternatively, these components may be remote from the CT scanner 100, such as elsewhere within an institution or hospital, or in an entirely different location linked to the CT scanner 100 via one or more configurable networks, such as the Internet, virtual private networks and so forth.

Figure 2:
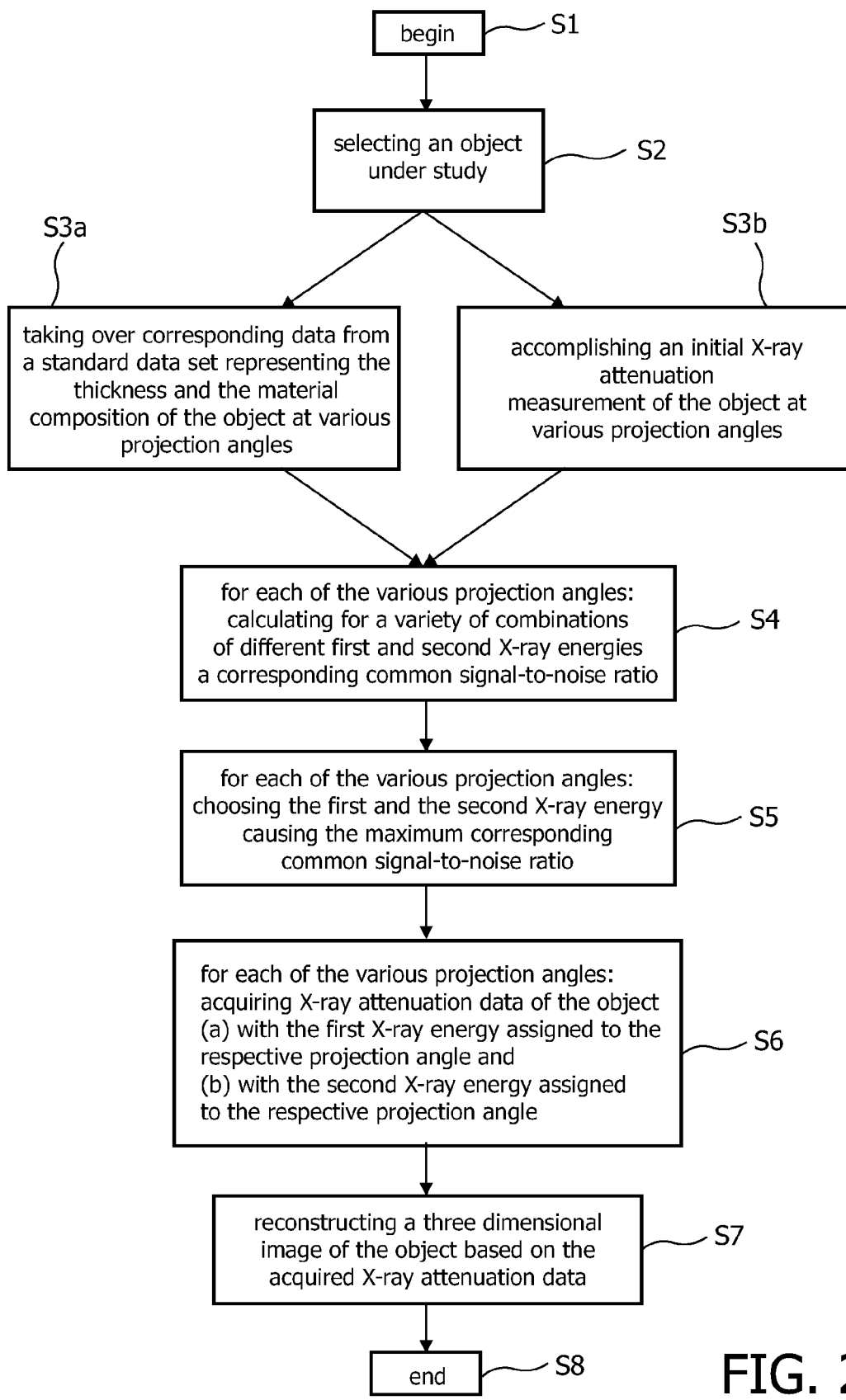
FIG. 2 shows a flow chart on a method for optimizing the signal-to-noise ratio of x-ray attenuation data related to two different X-ray energies.

FIG. 2 shows a flow chart on a method for dynamically optimizing the signal-to-noise ratio of x-ray attenuation data related to two different X-ray energies for each X-ray projection angle. The method starts with a step S1.

In step S2 there is selected an object of interest. The object of interest may either be an entire object or a part of an entire object. For instance the entire object may be a human patient and the part of the entire object may be the head of the patient.

The method continues with an estimation procedure. Thereby, the thickness and the material composition of the object for X-rays traversing the object at various projection angles are determined. As can be taken from FIG. 2, this estimation procedure may be carried out by means of at least on of the following method steps S3a and/or S3b, which will be explained in the following.

In step S3a there are taken over X-ray attenuation data from a standard data set representing the thickness and the material composition of the object under examination. The data set includes attenuation data at various different projection angles. The standard data set is based on a standard phantom corresponding to the current object under examination. Appropriate phantoms are available for all parts of an in particular human body. These phantoms include a composition of different materials, which exhibit at least within the diagnostically relevant energy range a similar X-ray attenuation or X-ray absorption behavior as compared to the object under examination.

In step S3a there is accomplished a so-called initial scanogram or pre-scan of the object under examination. Thereby, initial X-ray attenuation measurements are carried out at a variety of different projection angles and information regarding the current real object under examination is collected. This information includes an at least rough guess of the X-ray attenuation behavior of the object at different projection angles. In other words, the step S3a leads to an estimation of the thickness and the material composition of the real object.

Typically, it is sufficient that the initial X-ray attenuation measurements may be accomplished at a comparatively low radiation dose such that the improved quality of a final reconstructed dual-energy image justifies the additional radiation dose even in case the object under examination is a human being.

After completing the at least rough estimation of the X-ray attenuation behavior of the real object by carrying out step S3a and/or step S3b (e.g. step S3a may be used in order to verify the correct magnitude of the attenuation data) the described method continues with a step S4.

In step S4 there are calculated for a variety of combinations of different first and second X-ray energies a corresponding common signal-to-noise ratio, which predominately depends on the X-ray photon counts for each X-ray energy, respectively. This is done for each of the various projection angles. Thereby, for each projection angle there is generated a data set, which includes a respective common signal-to-noise ratio based on the X-ray attenuation data of both energies for a variety of combinations of different first and second X-ray energies.

In step S5 there is selected the first and the second X-ray energy, which cause the maximum common signal-to-noise ratio. This is done for each of the various projection angles. After selecting the optimal energies for each projection angle the described method continues with a further step S6.

In step S6 there are acquired X-ray attenuation data of the real object. This is done also for each of the various projection angles. The data acquisition includes a separate measurement of X-ray attenuation data with the first X-ray energy and with the second X-ray energy, respectively. Thereby, both the first and the second X-ray energy are optimized with respect to a corresponding signal-to-noise ratio for each projection angle.

In step S7 there is carried out a reconstruction procedure wherein a two- or three-dimensional image of the object is generated based on the before acquired dynamically adapted dual-energy X-ray attenuation data. This step can be carried out by means of known dual-energy reconstruction procedures.

Finally, the method ends with a step S8.

Figure 3:
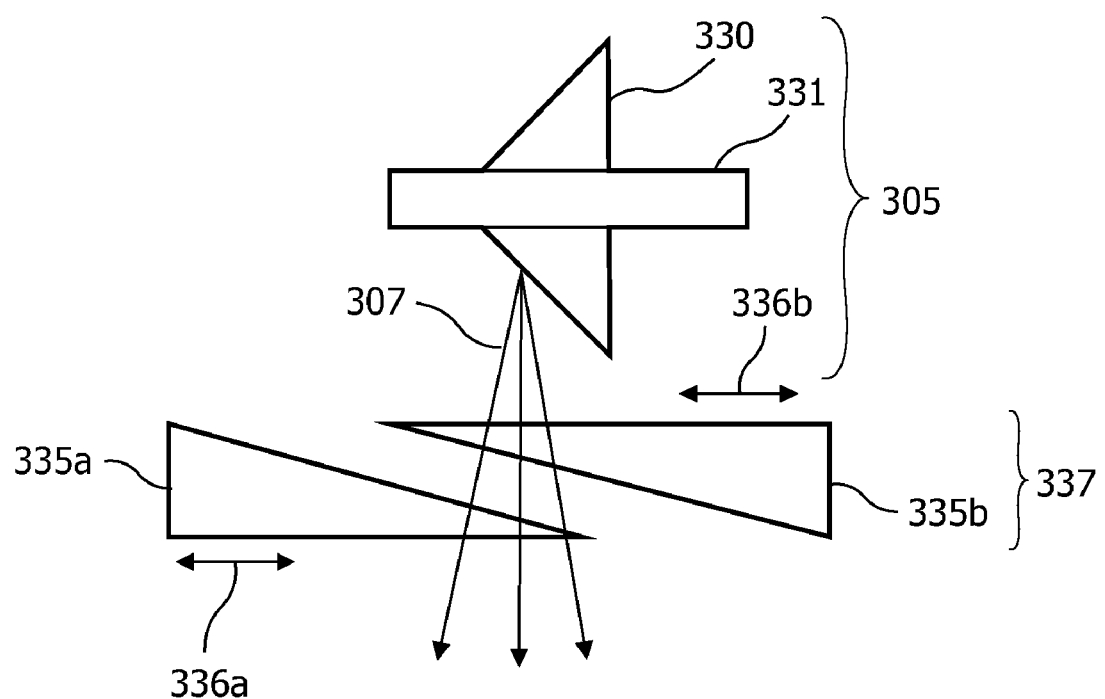
FIG. 3 shows a simplified schematic representation of an X-ray tube being equipped with an X-ray filter device comprising two filter elements.

FIG. 3 shows a simplified schematic representation of an X-ray tube 305 being equipped with an X-ray filter device 337. The X-ray filter device 337 is adapted for dynamically varying the spectral distribution of a radiation beam 307 emitted from the X-ray tube 305. Thereby, the spectral distribution of the X-radiation penetrating an object under examination (not depicted) may by optimized with respect to the SNR of dual-energy X-ray attenuation data acquired at a variety of different projection angles. By using X-ray detectors having an energy resolution the X-ray photon counts for the two energies may be optimized in order to achieve a maximum common SNR for the acquired dual-energy attenuation data. This optimization of the spectral distribution is performed individually for each projection angle.

The X-ray tube 305 comprises an anode 330, which is mounted on a rotatable shaft 331. Electrons (not depicted) are directed onto a focal spot at the surface of the anode 330 such that a radiation beam 307 is emitted from the focal spot.

The X-ray filter device 337, which is arranged in the beam paths of the X-ray beam 307, comprises two filter elements 335a and 335b, which each are formed in the shape of a wedge. The two wedges 335a and 335b are translatory movable along a direction 336a and a direction 336b, respectively. The two wedges 335a and 335b, which are formed in a symmetric way, are moved symmetrically with respect to the radiation beam 307. This means that if the wedge 335a is moved to the right, the wedge 335b is moved to the left and vice versa. This ensures, that the attenuation and the spectral variation of the beam 307 are carried out in a spatial homogeneous way. Thereby, all radiation paths of the X-ray beam 307 are treated influenced by the X-ray filter device 337 in the same way.

It has to be pointed out that the design of filter elements 335a and 335b may differ slightly from an exact symmetric design. This can be positively exploited in order to compensate for a non-uniform spatial energy and intensity distribution of the X-rays being emitted from the anode 330. Such a fractionally non-uniform spatial energy and intensity distribution may be based on the fact that the surface of the anode 330 is oriented in an angular deviation with respect to a optical axis of the X-ray beam 307. Since X-rays are typically generated not exactly at the surface of the anode 330 but within a small depths within the anode 330, the X-rays being emitted at a more flat angle with respect to the anode surface (right X-ray path in FIG. 3) suffer from a slightly higher absorption within the anode material as compared to the X-rays being emitted at a steeper angle with respect to the surface of the anode (left X-ray path in FIG. 3).

Figure 4A:
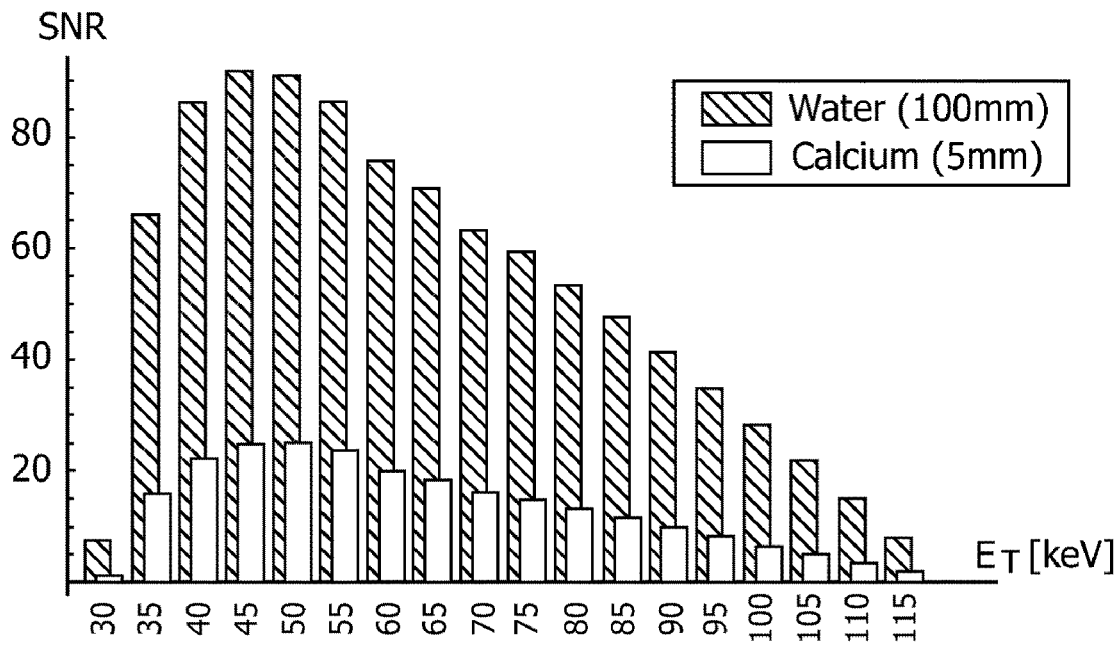
FIGS. 4a and 4b show diagrams depicting an exemplary behavior of a SNR of dual energy attenuation data of two different probe objects when a threshold Energy $E_T$ is varied.
Figure 4B:
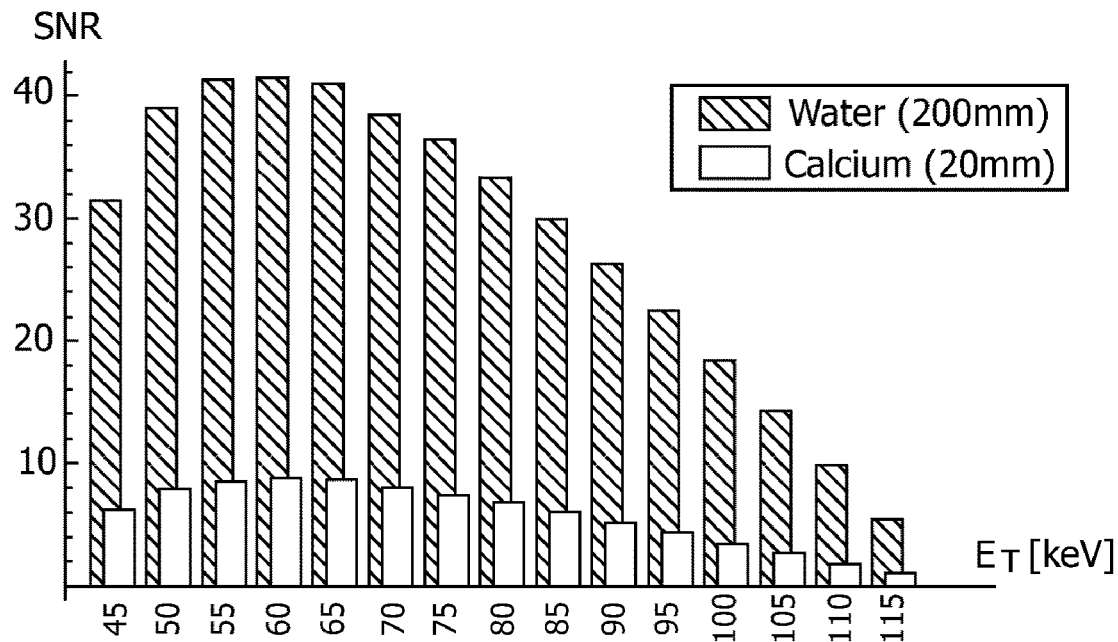

FIGS. 4a and 4b show diagrams depicting an exemplary behavior of a SNR of dual-energy attenuation data of two different probe objects when a threshold Energy $E_T$ is varied. However, the two different probe objects may correspond to two different view angles respective projection angles of one and the same object.

The diagrams each show the SNR of first attenuation data for a first energy range and the SNR of second attenuation data for a second energy range. The attenuation data are acquired by means of a single energy threshold detector wherein the threshold energy $E_T$ may be dynamically adjusted. The two energy ranges are separated by the threshold energy $E_T$ and the two SNR are respectively depicted as a function of $E_T$.

As has been described above the two X-ray attenuations may be described from a physical point of view as the cross-sections for the photo effect and for Compton scattering, respectively. From a more practical point of view the two X-ray attenuations may alternatively be described by the mass attenuation of water and calcium, respectively.

FIG. 4a shows the SNR for a projection wherein the X-rays are transmitted through a material composition comprising 100 mm water and 5 mm calcium. As can be seen from FIG. 4a the SNR for both the upper energy attenuation data and the lower energy attenuation data have a common maximum when the threshold energy $E_T$ is adjusted to approximately 45 keV.

FIG. 4b shows the SNR for a projection wherein the X-rays are transmitted through a material composition comprising 200 mm water and 20 mm calcium. As can be seen from FIG. 4b the SNR for both the upper energy attenuation data and the lower energy attenuation data have a common maximum when the threshold energy $E_T$ is adjusted to approximately 60 keV.

From a comparison of the SNR behavior of the two objects respectively two projection angles of one and the same object one can conclude that the optimal threshold energy $E_T$ increases with an increasing X-ray absorption of the material being present in the corresponding X-ray paths.

It has to be pointed out that the inventors have also found out the reason why the maxima for the two different SNR in each of the diagrams depicted in FIGS. 4a and 4b are respectively located approximately at the same threshold energy. As can be seen from formulae (2a) and (2b), the values of the variances $\sigma_{Ai}^2$ depend predominately on the above-given SQF, which is the same for $\sigma_{A1}^2$ and for $\sigma_{A2}^2$. The enumerator of the variances $\sigma_{A1}^2$ and for $\sigma_{A2}^2$ exhibits a weak dependence on the threshold energy, respectively. This can be seen from the fact that each photon from a total number of photons has to be counted either as a low-energy event or as a high-energy event. This means that each photon increases only one of the two SNR depicted in each diagram. Since the inverted SNR values are summed up for $\sigma_{A1}^2$ as well as for $\sigma_{A2}^2$, a variation of $E_T$ affects the variances $\sigma_{A1}^2$ as well as $\sigma_{A2}^2$ only weakly.

Figure 5:
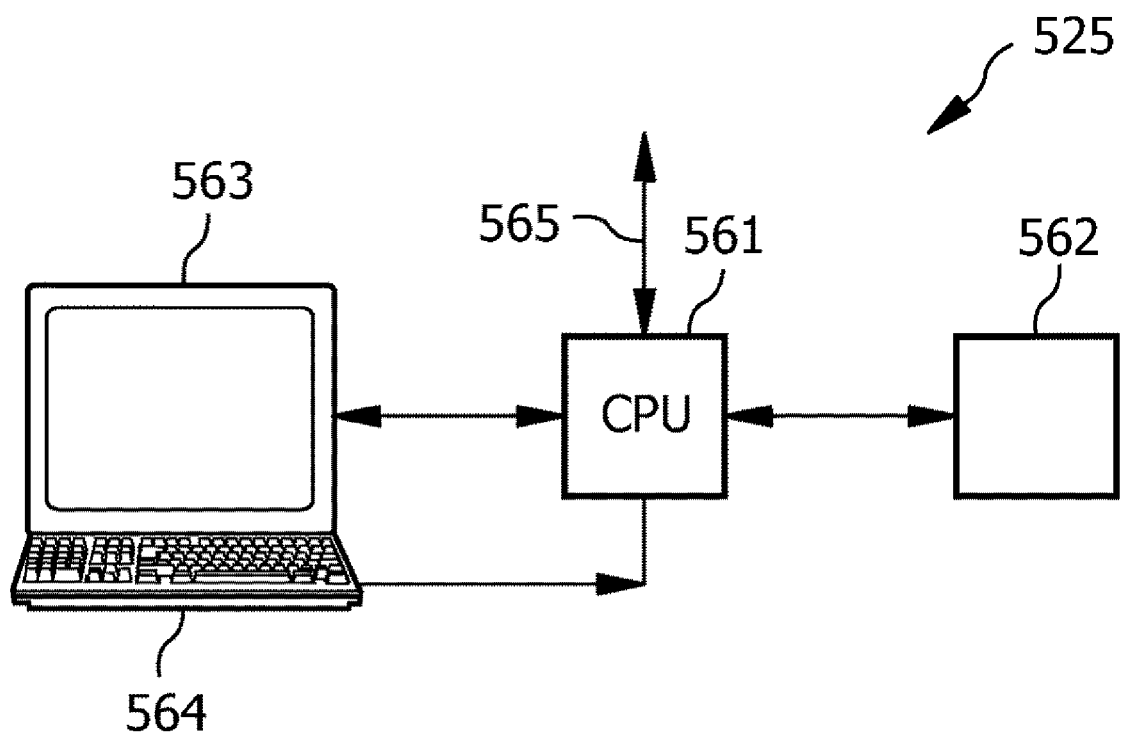
FIG. 5 shows an image processing device for executing an exemplary embodiment of a method in accordance with the present invention.

FIG. 5 depicts an exemplary embodiment of a data processing device 425 according to the present invention for executing an exemplary embodiment of a method in accordance with the present invention. The data processing device 525 comprises a central processing unit (CPU) or image processor 561. The image processor 561 is connected to a memory 562 for temporally storing acquired projection data. Via a bus system 565 the image processor 561 is connected to a plurality of input/output network or diagnosis devices, such as a CT scanner. Furthermore, the image processor 561 is connected to a display device 563, for example a computer monitor, for displaying information or one or more images reconstructed by the image processor 561. An operator or user may interact with the image processor 561 via a keyboard 564 and/or any other output devices, which are not depicted in FIG. 5.

It has to be pointed out the invention is not limited to dual energy computed tomography system generating three-dimensional images. The described noise reduction is also applicable for dual energy computed radiography imaging systems, which typically produce two-dimensional images like e.g. angiographic X-ray imaging systems. In any case, the dual energy X-ray imaging may be carried out with or without contrast agents.

It should be noted that the term "comprising" does not exclude other elements or steps and the "a" or "an" does not exclude a plurality. Also elements described in association with different embodiments may be combined. It should also be noted that reference signs in the claims should not be construed as limiting the scope of the claims.

LIST OF REFERENCE SIGNS:

| | |
|---|---|
| 100 | computer tomography apparatus/CT scanner |
| 101 | gantry/rotational holder |
| 102 | rotational axis |
| 103 | motor |
| 105 | polychromatic X-ray source |

-continued

LIST OF REFERENCE SIGNS:

| | |
|---|---|
| 106 | aperture system |
| 107 | polychromatic radiation beam |
| 110 | patient |
| 110a | object of interest/head of patient |
| 112 | table |
| 113 | motor |
| 115 | energy resolving radiation detector |
| 115a | detector elements |
| 117 | rotation direction |
| 118 | pulse discriminator unit |
| 120 | motor control unit |
| 125 | data processing device (incl. reconstruction unit) |
| 126 | monitor |
| 127 | printer |
| 128 | Picture archiving and communication system (PACS) |
| S1 | step 1 |
| S2 | step 2 |
| S3a | step 3a |
| S3b | step 3b |
| S4 | step 4 |
| S5 | step 5 |
| S6 | step 6 |
| S7 | step 7 |
| S8 | step 8 |
| 305 | X-ray tube |
| 307 | radiation beam |
| 330 | anode |
| 331 | rotatable shaft |
| 335a | filter element/wedge |
| 335b | filter element/wedge |
| 336a | translational direction |
| 336b | translational direction |
| 337 | X-ray filter device |
| 440a | diagram: SNR for object with 100 mm water and 5 mm calcium |
| 440b | diagram: SNR for object with 200 mm water and 20 mm calcium |
| 525 | data processing device |
| 561 | central processing unit/image processor |
| 562 | memory |
| 563 | display device |
| 564 | keyboard |
| 565 | bus system |

The invention claimed is:

1. A method for dynamically optimizing the signal-to-noise ratio of attenuation data related to two different X-ray energies for reconstructing an image of an object under examination, the method comprising::
   estimating, with a processor the thickness and the material composition of the object at a first projection angle of X-rays traversing the object,
   estimating, with the processor, the thickness and the material composition of the object at a second projection angle of X-rays traversing the object,
   selecting, with the processor, a first X-ray energy assigned to the first projection angle and a second X-ray energy assigned to the first projection angle in such a manner that a first common signal-to-noise ratio of attenuation data based on the first X-ray energy assigned to the first projection angle and on the second X-ray energy assigned to the first projection angle is optimized,
   selecting, with the processor, a third X-ray energy assigned to the second projection angle and a fourth X-ray energy assigned to the second projection angle in such a manner that a second common signal-to-noise ratio of attenuation data based on the third X-ray energy assigned to the second projection angle and on the fourth X-ray energy assigned to the second projection angle is optimized,
   acquiring X-ray attenuation data of the object at the first projection angle with the first X-ray energy assigned to the first projection angle and with the second X-ray energy assigned to the first projection angle, and
   acquiring X-ray attenuation data of the object at the second projection angle with the third X-ray energy assigned to the second projection angle and with the fourth X-ray energy assigned to the second projection angle.

2. The method according to claim 1, the estimating the thickness and the material composition of the object at the first projection angle and at the second projection angle, comprising:
   using X-ray attenuation data from a standard data set representing the thickness and the material composition of the object under examination.

3. The method according to claim 1, the estimating the thickness and the material composition of the object at the first projection angle and at the second projection angle, comprising:
   accomplishing an initial attenuation measurement of the object at different projection angles.

4. The method according to claim 1, the selecting the first and the second X-ray energy assigned to the first projection angle comprising:
   calculating for a variety of combinations of different first and second X-ray energies a respective first common signal-to-noise ratio, and
   choosing the first and second X-ray energy combination that causes calculation of a maximum first common signal-to-noise ratio.

5. The method according to claim 1, the selecting the first and the second X-ray energy assigned to the second projection angle, comprising:
   calculating for a variety of combinations of different third and fourth X-ray energies a respective second common signal-to-noise ratio, and
   choosing the third and fourth X-ray energy combination that causes calculation of a maximum second common signal-to-noise ratio.

6. The method according to claim 1, further comprising:
   estimating the thickness and the material composition of the object at a third projection angle of X-rays traversing the object,
   selecting a fifth X-ray energy assigned to the third projection angle and a sixth X-ray energy assigned to the third projection angle in such a manner that a third common signal-to-noise ratio of attenuation data based on the fifth X-ray energy assigned to the third projection angle and on the sixth X-ray energy assigned to the third projection angle is optimized, and
   acquiring X-ray attenuation data of the object at the first projection angle with the fifth X-ray energy assigned to the third projection angle and with the sixth X-ray energy assigned to the third projection angle.

7. The method according to claim 1, wherein the first X-ray energy and the second X-ray energy are within any range between 10 keV and 150 keV.

8. The method according to claim 1, wherein the first X-ray energy and the second X-ray energy are provided by an X-ray source emitting a polychromatic energy spectrum.

9. The method according to claim 8, the acquiring X-ray attenuation data at the first and the second projection angles, respectively, comprising:
   varying an acceleration voltage of the X-ray source for the first and second projection angle, respectively.

10. The method according to claim 8, the acquiring X-ray attenuation data at the first and the second projection angles, respectively, comprising:

varying, for the first and the second projection angle, respectively, the material and/or the thickness of a filter which is arranged in between the X-ray source and a dedicated X-ray detector.

11. The method according to claim 10, wherein the material and/or the thickness of the filter is varied in such a manner that the entire absorption of X-rays traversing the object is kept stable at least approximately at least at the first projection angle and at the second projection angle.

12. The method according to claim 10, the varying the material and/or the thickness of the filter, comprising:
   moving, for the first and second projection angle, respectively, two filter elements in a symmetric manner into and out of an X-ray beam being emitted from the X-ray source.

13. The method according to claim 1, wherein the first X-ray energy corresponds to a first energy interval.

14. The method according to claim 13, wherein the second X-ray energy corresponds to a second energy interval.

15. The method according to claim 14, wherein a threshold energy separates the first energy interval and the second energy interval.

16. The method according to claim 1, the acquiring X-ray attenuation data at the first and the second projection angles, respectively, comprising:
   varying, the first and the second X-ray energy, and varying the third and fourth X-ray energy, for the first and second projection angle, respectively.

17. A computed tomography system for generating images of an object under examination based on attenuation data related to two different X-ray energies, the computed tomography system, comprising:
   a radiation source adapted for emitting a radiation beam,
   a radiation detector adapted for detecting the radiation beam after the beam has passed the object,
   a rotatable holder for jointly rotating the radiation source and the radiation detector around the object under examination,
   a memory for storing estimated data related to the thickness and/or to the material composition of the object and for storing acquired X-ray attenuation data of the object at different projection angles and with two different X-ray energies, and
   a data processor, which is adapted for performing the method as set forth in claim 1.

18. A data processing device for dynamically optimizing the signal-to-noise ratio of attenuation data related to two different X-ray energies for reconstructing an image of an object under examination, the data processing device, comprising:
   a memory for storing estimated data related to the thickness and/or to the material composition of the object and for storing acquired X-ray attenuation data of the object at different projection angles and with two different X-ray energies, and
   a data processor for dynamically optimizing the signal-to-noise ratio of attenuation data related to two different X-ray energies for reconstructing an image of the object under examination,
which data processor is adapted for performing the method as set forth in claim 1.

19. A computer-readable medium on which there is stored a computer program for dynamically optimizing the signal-to-noise ratio of attenuation data related to two different X-ray energies for reconstructing an image of an object under examination, the computer program, when being executed by a data processor, is adapted for performing the method as set forth in claim 1.

* * * * *